B. H. EHRINGER.
TRACTION MAT.
APPLICATION FILED FEB. 1, 1922.
1,412,048.
Patented Apr. 11, 1922.
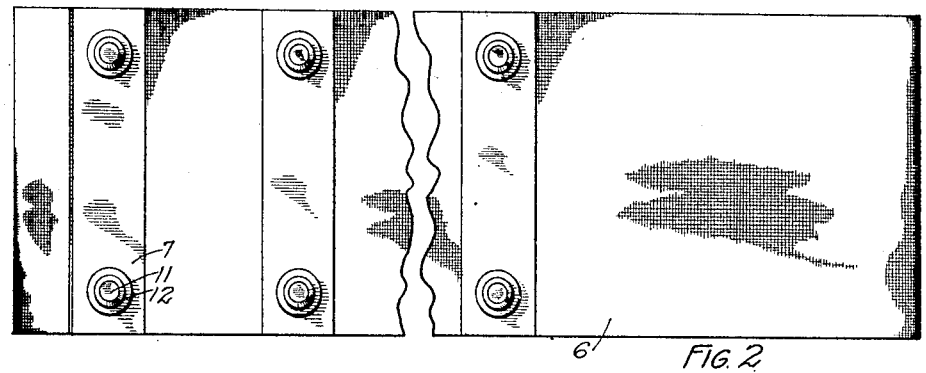
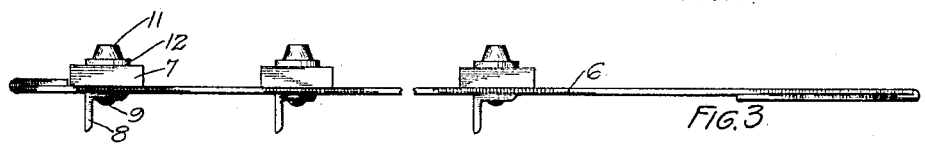
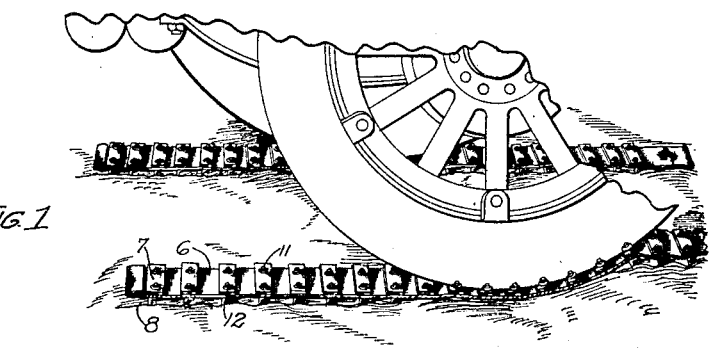
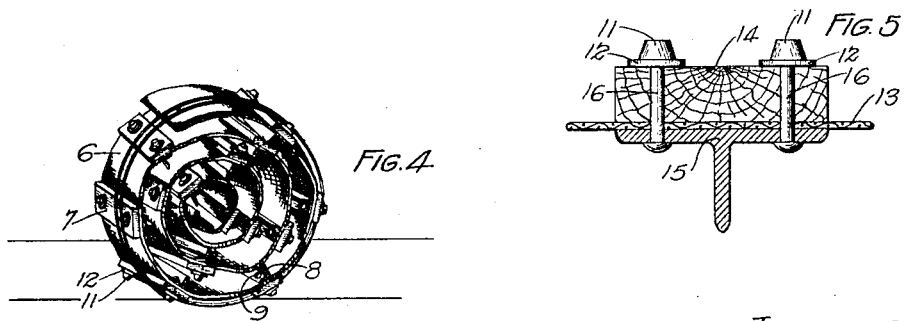
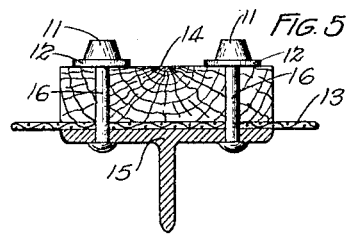
INVENTOR:
Bert H. Ehringer
By Ira J. Wilson
ATTY.

UNITED STATES PATENT OFFICE.

BERT H. EHRINGER, OF CHICAGO, ILLINOIS.

TRACTION MAT.

1,412,048.　　　Specification of Letters Patent.　　Patented Apr. 11, 1922.

Application filed February 1, 1922. Serial No. 533,380.

*To all whom it may concern:*

Be it known that I, BERT H. EHRINGER, a citizen of the United States, residing at Chicago, in the county of Cook and State of Illinois, have invented certain new and useful Improvements in Traction Mats, of which the following is a specification.

This invention relates in general to traction devices and has more particular reference to a device which may be termed a mat adapted to be disposed beneath the wheels of an automobile to facilitate traction thereof when the automobile becomes stalled or stuck in mud, sand or other soft places.

One of the primary purposes of this invention is to provide a mat for the purpose indicated which will engage with the soil beneath the wheel so that it will not be thrown backwardly and outwardly by the rotation of the wheel and which will also provide traction on the upper surface of the mat to enable the wheel to grip the mat and thereby produce the traction requisite to movement of the car.

Another object of the invention is to provide a mat which will be simple in construction and economical to manufacture, one which can be rolled up into compact form so as to occupy a minimum amount of storage space and one which will be light so it can be readily handled and placed in position forwardly of a wheel where it will be engaged upon rotation of the wheel.

Other objects and advantages of this invention should be readily appreciated as the same becomes better understood by reference to the following description when considered in connection with the drawings.

Referring to the drawings—

Fig. 1 is a fragmentary view showing a pair of mats embodying my invention in operative position beneath the wheels of an automobile;

Fig. 2 is a plan view of the mat;

Fig. 3 is an edge view thereof;

Fig. 4 is a view showing one of the mats rolled up for storage; and

Fig. 5 is a fragmentary sectional view of a modified form of the construction.

Referring now to the drawings more in detail, reference character 6 indicates generally the body of a mat which is formed of flexible material, preferably a fabric such as heavy canvas or the like which will be light yet strong and durable and which will not sink into the soft ground beneath the wheel.

Upon the upper face of the body there are disposed at spaced intervals cleats 7 preferably made of wood. Upon the lower face there is a corresponding number of angle bars 8 which in the form shown in Figs. 1 to 4 inclusive are of angle iron formation, one flange being disposed flat against the lower face of the fabric body and the other flange extending downwardly for engagement with the soil.

The cleats and angle bars are fixedly secured to the body by suitable fastening means, in the present instance illustrated as rivets 9, the upper ends 11 of which project a limited distance above the upper face of the cleats so as to form guides which prevent the wheel from sliding laterally off the mat. For strengthening purposes washers 12 are preferably interposed between the heads of the rivets and the cleats 7.

The mats are customarily sold in pairs and may be rolled up into the form shown in Fig. 4 and carried in the tool box or beneath the seat of the car where they will occupy only a small amount of storage space. When the car becomes stuck in mud, sand or other soft material, the mats are unrolled and placed in line with the rear wheels as close to the bottom and forward edge of the wheel as possible. When the car is started up the wheels engage with the cleats on the upper surfaces of the mats, thereby securing the requisite traction, and the mats themselves will be held against rearward movement beneath the wheels by the downwardly projecting flanges of the angle bars which sink into the ground and anchor the mats against slippage. It will be apparent therefore that by the employment of these mats adequate traction is afforded which will permit the car to pull itself out. In use the mats themselves are anchored against slippage along the ground and the spaced cleats on their upper faces enable the tires to grip the same so that adequate traction is afforded.

The mats above described are designed particularly for pleasure vehicles and lighter trucks. For heavier trucks a stronger and more substantial construction of mat is preferable, and for such use I prefer a mat of the type disclosed in Fig. 5 wherein reference character 13 indicates the fabric body of the mat which may be sufficiently wide to accommodate wheels with the widest tires, and in this instance the cleats 14 are wider than those shown in Figs. 1 and 2 and the angle bars 15 instead of being of angle iron formation are substantially T-shape, as illustrated, and two rivets 16 are employed at each side of the body for anchoring the cleats and angle bars to the body.

It is believed that my invention in many of its inherent advantages will be understood and appreciated from the foregoing without further description and it should be obvious that the constructive details thereof may be varied within considerable limits without departing from the essence of the invention as defined in the following claims.

I claim:

1. A traction mat comprising a flexible fabric body, transversely extending traction devices disposed upon the upper and lower faces of said body and means for fastening the upper and lower devices together and to the fabric between them.

2. A traction mat comprising a flexible fabric body, relatively flat traction devices secured to the upper face of said body and extending transversely thereof, and relatively sharp traction devices secured to the lower face of said body and extending transversely thereof.

3. A traction mat comprising a flexible fabric body, transversely disposed cleats attached to the upper face of said body, and transversely disposed metal bars attached to the lower face of said body.

4. A traction mat comprising a flexible non-metallic body, cleats extending transversely thereof on the upper face of the body, angular metal bars extending transversely thereof at the lower face of the body, and means extending through said body for securing said cleats and bars to the body.

5. A traction mat comprising a flexible fabric body, cleats on the upper face of the body, angular bars on the lower face of the body, and means extending through said bars, said body and said cleats for securing the cleats and bars to the body.

6. A traction mat comprising a flexible fabric body, cleats extending transversely of the body on one face thereof, angle bars extending transversely of the body on the other face thereof, and rivets projecting through opposed cleats and angle bars and through said body whereby said cleats and angle bars are anchored to the body.

7. A traction mat comprising a flexible body provided at spaced intervals on one face with transversely disposed cleats and at corresponding intervals on the opposite face with transversely disposed angle bars, and means extending through said angle bars, cleats and body for anchoring said cleats and angle bars to the body and projecting above said cleats to provide guides adjacent each edge of said mat.

BERT H. EHRINGER.